(12) United States Patent
Farmer et al.

(10) Patent No.: US 8,407,103 B2
(45) Date of Patent: *Mar. 26, 2013

(54) SYSTEMS FOR ACCESSING INFORMATION RELATED TO AN ORDER OF COMMODITY

(75) Inventors: Joseph W. Farmer, Nyssa, OR (US);
James G. Farmer, Nyssa, OR (US);
Charles W. Farmer, Nyssa, OR (US)

(73) Assignee: Trace Produce, LLC, Nyssa, OR (US)

( * ) Notice: Subject to any disclaimer, the term of this patent is extended or adjusted under 35 U.S.C. 154(b) by 389 days.

This patent is subject to a terminal disclaimer.

(21) Appl. No.: 12/437,727

(22) Filed: May 8, 2009

(65) Prior Publication Data

US 2009/0254460 A1 Oct. 8, 2009

Related U.S. Application Data

(63) Continuation-in-part of application No. 11/363,785, filed on Feb. 27, 2006, now Pat. No. 8,131,599.

(51) Int. Cl.
*G06Q 30/00* (2012.01)
*G06Q 10/00* (2012.01)
(52) U.S. Cl. .................... 705/26.61; 705/1.1
(58) Field of Classification Search .............. 705/1.1, 705/26.61
See application file for complete search history.

(56) References Cited

U.S. PATENT DOCUMENTS

| | | | |
|---|---|---|---|
| 5,478,990 A | | 12/1995 | Montanari et al. |
| 5,503,859 A | * | 4/1996 | Creason et al. ............ 426/308 |
| 5,913,210 A | | 6/1999 | Call |
| 6,220,509 B1 | * | 4/2001 | Byford ..................... 235/375 |
| 6,545,604 B1 | | 4/2003 | Dando et al. |
| 6,963,881 B2 | | 11/2005 | Pickett et al. |
| 7,183,923 B2 | | 2/2007 | Sasaki et al. |
| 7,260,564 B1 | | 8/2007 | Lynn et al. |
| 7,681,527 B2 | | 3/2010 | Pratt |
| 7,689,465 B1 | | 3/2010 | Shakes et al. |
| 8,019,633 B2 | | 9/2011 | Stroman et al. |

(Continued)

FOREIGN PATENT DOCUMENTS

| | | |
|---|---|---|
| JP | 2002-297625 | 10/2002 |
| KR | 10-2004-0110912 | 12/2004 |

(Continued)

OTHER PUBLICATIONS

"John Deere Partners with Vantagepoint Network and Cropverifeye.Com, LLC to Introduce the New CropTracer(TM) System" PR Newswire; Feb. 26, 2001.*

(Continued)

*Primary Examiner* — John Hayes
*Assistant Examiner* — Allen J Jung
(74) *Attorney, Agent, or Firm* — Holland & Hart LLP

(57) ABSTRACT

A commodity inspection method, including gathering inspection information from a commodity lot; collecting grower, field, and packing information associated with the commodity lot; recording purchase orders associated with the commodity lot; assigning a trace code to each of the purchase orders; entering the inspection information, the grower, field, and packing information, the purchase orders, and the trace codes into a central database; updating a content of a web-based application with the inspection information, the grower, field, and packing information, the purchase orders, and the trace codes within the central database; and allowing the customer to access the inspection information, and the grower, field, and packing information, by entering one of the trace codes into the web-based application; wherein each of the purchase orders associated with the commodity lot is linked within the web-based application; and wherein the method incorporates Global Standards One (GS1) standards.

12 Claims, 17 Drawing Sheets

U.S. PATENT DOCUMENTS

| | | |
|---|---|---|
| 8,019,662 B2 | 9/2011 | Lucas |
| 2001/0011437 A1 | 8/2001 | Shortridge et al. |
| 2001/0032161 A1 | 10/2001 | Thomas et al. |
| 2001/0049634 A1 | 12/2001 | Stewart |
| 2003/0009254 A1 | 1/2003 | Carlson et al. |
| 2003/0018665 A1 | 1/2003 | Dovin |
| 2003/0069772 A1 | 4/2003 | Roberts et al. |
| 2004/0083201 A1 | 4/2004 | Sholl et al. |
| 2004/0122733 A1 | 6/2004 | Hanschen et al. |
| 2004/0177011 A1 | 9/2004 | Ramsay et al. |
| 2004/0223606 A1 | 11/2004 | Enete et al. |
| 2005/0051109 A1 | 3/2005 | Fantin et al. |
| 2005/0075900 A1 | 4/2005 | Amgruimbau, III |
| 2005/0086132 A1 | 4/2005 | Kanitz et al. |
| 2005/0149373 A1 | 7/2005 | Amling et al. |
| 2005/0246752 A1 | 11/2005 | Liwerant et al. |
| 2005/0266494 A1 | 12/2005 | Hodge |
| 2007/0118739 A1* | 5/2007 | Togashi et al. ............... 713/158 |
| 2007/0156544 A1 | 7/2007 | Meyer et al. |
| 2007/0203724 A1 | 8/2007 | Farmer et al. |
| 2007/0203818 A1 | 8/2007 | Farmer et al. |
| 2008/0021740 A1 | 1/2008 | Beane et al. |
| 2008/0065473 A1 | 3/2008 | Stroman et al. |
| 2008/0262923 A1 | 10/2008 | Farmer et al. |
| 2008/0300984 A1* | 12/2008 | Li ................................. 705/14 |
| 2010/0106660 A1 | 4/2010 | Farmer et al. |

FOREIGN PATENT DOCUMENTS

| | | |
|---|---|---|
| WO | 2005002747 A1 | 1/2005 |
| WO | 2005-022303 | 3/2005 |

OTHER PUBLICATIONS

International Search Report dated Nov. 20, 2009, for International Application No. PCT/US2009/039533 (3 pages).

Anon., "Safety Net: In Light of a Recent Spike in Discoveries of Foodborne Contamination, Preventing Such Events at All Points in the Food Supply Chain Has Become More Important Than Ever," Progressive Grocer, vol. 83, No. 6, p. 67, Apr. 15, 2004.

Anon., "John Deere Partners with Vantagepoint Network and Cropverifeye.com, Llc to Introduce the New Croptracer™ System," PR Newswire, Feb. 26, 2001.

Clemens, R., "Meat Traceability in Japan," Iowa Ag Review, Fall 2003, vol. 9, No. 4, pp. 4-5.

International Search Report dated Mar. 4, 2010 for International Application No. PCT/US2009/061095 (1 page).

Anon., "MOL Launches Web Track-and-Trace," Journal of Commerce, p. 1, Mar. 30, 2004.

Ahlstrom, "Google Breaks New Ground with Free Phone Call Service," Irish Times, Aug. 25, 2005.

\* cited by examiner

| BAG RUN DETAIL | | | | _ □ X |
|---|---|---|---|---|
| Run Date | 4/18/2001 | Unit Types | 4X6 | |
| Run No | 4/18/2001 | Total Bags | 0 | |
| Grower | DSRT | Total Workers | 60 | |
| Grower name | Deseret Farms | Direct Workers | 50 | |
| Lot ID | YGRAN-B04 | Total Hours | 5.50 | |
| Number of Units | 290 | Man hours | 330.00 | |
| From Storage | 3RD7 | | | |

Total Cost Per Bag  0.000   Direct Cost Per Bag  0.000

| New Lot # | Color | Variety | New Storage | # of Bins | Date |
|---|---|---|---|---|---|
| | | | | | |

NEXT | PREV | Browse | Add | Edit | Delete | Print | Detail
OK | Exit

*FIG. 4*

Fort Boise Produce
Inspection Report Summary

File No. 62247

| Product | Samples | Avg Onion Count | OffSize Minimum | OffSize Maximum | Tops | Peelers | Damage | Serious Damage | Decay |
|---|---|---|---|---|---|---|---|---|---|
| JY1GNP50 Runs: 1 Jumbo Yellow GOLD N PRIDE 50# | 48 | 63.72 | 0.04% | 0.00% | 5.53% | .02% | .42% | .35% | .35% |
| JYINONB50 Runs: 1 Jumbo Yellow NON BRAND 50# | 15 | 52.73 | 0.00% | 0.00% | 2.86% | .05% | .53% | .07% | .07% |
|  |  |  |  |  |  |  |  |  |  |

KEY (Per 50lb.)
Note: Decay % is included in Damage % and Serious Damage
US #1 Offsize Min allowed (undersize) is 5%
US #1 Offsize Max allowed (oversize) is 10%
US #1 Tops allowed is 30%
US #1 Peelers allowed is 10%
US #1 Damage allowed is 5%
US #1 Decay allowed is 2% (Decay is included in Damage% and Serious Damage %)

Avg Onion Count

55-60 Onions per 50lb bag – 80% or Better 3.5 Inch Onions
60-65 Onions per 50lb bag – 75% or Better 3.5 Inch Onions
65-70 Onions per 50lb bag – 70% or Better 3.5 Inch Onions US #2 Percentage Tolerances for Damage, Decay, and Offsize are the same as US #1. Other Requirements do not apply.

Serious Damage – Any specific defect which seriously detracts from the appearance, or the edible marketing quality of the onions.

Create an Account

| | |
|---|---|
| Company Name: | ☐ |
| Commodities: | Drop-down box |
| Type of Account: | ○ Shipper or Grower<br>○ Buyer, Vendor, or Retailer<br>○ Customer/Consumer |
| Facility Identification #: | ☐ |

The Facility Identification number is your GS1 company prefix or number assigned by the State Department of Agriculture. If you do not know your number, use 000. This number is not used for accounts other than Shippers and Growers.

| | |
|---|---|
| Company Phone #: | ☐ |
| Company Fax #: | ☐ |
| Physical Address: | ☐ |
| City: | ☐ |
| State/Province: | ☐ |
| Country: | ☐ |
| ZIP/Postal Code: | ☐ |
| Food Safety Contact Name: | ☐ |
| Food Safety Contact #: | ☐ |

SYSTEMS FOR ACCESSING INFORMATION RELATED TO AN ORDER OF COMMODITY

RELATED APPLICATIONS

This application is a continuation-in-part of U.S. patent application Ser. No. 11/363,785 titled "Methods and Systems for Accessing Information Related to an Order of a Commodity" filed on Feb. 27, 2006, now U.S. Pat. No. 8,131,599, which application is incorporated herein by reference in its entirety.

BACKGROUND

The ability to trace produce back to its packing facilities, inspection points, and even the field in which it was grown is becoming more of a necessity in the produce industry as concerns regarding food safety increase. In the event of a food-borne illness outbreak, for example, damage may be limited if the source of the contaminated product is identified quickly so that other products grown in the same field, processed in the same packing facility, and/or transported in the same vehicle can be quarantined.

The events of Sep. 11, 2001 reinforced the need to enhance the security of the United States. They also raised awareness of the possibility of bioterrorism attacks. Hence, Congress passed the Public Health Security and Bioterrorism Preparedness and Response Act of 2002 (the Bioterrorism Act), which requires food handlers to establish and maintain records for all food directly in contact with its finished container.

In addition, many customers, such as brokers and retailers, are increasingly requesting real time access to information regarding the produce they buy. For example, they often desire to view shipping, tracing, and inspection information immediately after they place an order for produce. Many customers also require independent certification audits of all produce sold in their stores.

Currently, much of the shipping, tracing, and inspection information is recorded on paper. Moreover, a myriad of different recording techniques are used to record this information. Consequently, it is often difficult to comply with government requirements to be able to quickly trace produce back to the packing facility in which it was processed and to the field in which it was grown. It is also difficult to comply with customers' requests to instantaneously access information regarding their produce orders.

SUMMARY

A commodity inspection method, including gathering inspection information from a commodity lot; collecting grower, field, and packing information associated with the commodity lot; recording purchase orders associated with the commodity lot; assigning a trace code to each of the purchase orders; entering the inspection information, the grower, field, and packing information, the purchase orders, and the trace codes into a central database; updating a content of a web-based application with the inspection information, the grower, field, and packing information, the purchase orders, and the trace codes within the central database; and allowing the customer to access the inspection information, and the grower, field, and packing information, by entering one of the trace codes into the web-based application; wherein each of the purchase orders associated with the commodity lot is linked within the web-based application; and wherein the method incorporates Global Standards One (GS1) standards.

A system for allowing a customer to access information related to an order of a commodity selected from a source lot, the system including a server configured to store the information in a central database, the information including inspection information corresponding to the source lot of the order of said commodity including either an inspection photograph or an inspection multi-media recording of the source lot of said commodity and at least one or more of sales information, shipping information, packout information, inventory information, and tracing information corresponding to the order of the commodity; one or more terminals having one or more applications configured to enter the information into the central database; and a web-based application configured to allow the customer to access said information within the central database; wherein the system incorporates Global Standards One (GS1) standards.

BRIEF DESCRIPTION OF THE DRAWINGS

The accompanying drawings illustrate various embodiments of the principles described herein and are a part of the specification. The illustrated embodiments are merely examples and do not limit the scope of the disclosure.

FIG. 4 is a screen shot of an exemplary software program that may be used by a packing facility worker to assign a tracking identification (ID) to an incoming lot of produce within a central database according to principles described herein.

FIG. 9 is a screen shot of a web page showing an exemplary inspection report summary according to principles described herein.

FIG. 16 is a screen shot of a web page showing an exemplary account creation page according to principles described herein.

Throughout the drawings, identical reference numbers designate similar, but not necessarily identical, elements.

DETAILED DESCRIPTION

Methods and systems for allowing a customer, a supplier, or a regulatory agency to access information related to an order of a commodity are described herein. The information may include sales information, shipping information, tracing information, and/or inspection information corresponding to the order of the commodity. In some examples, as will be described in more detail below, the information is entered into a central database via one or more applications residing on one or more terminals. A web-based application is regularly updated with the information within the central database. An authorized customer, supplier, regulatory agency, or other entity may then login to the web-based application and access the desired information related to the order of the commodity.

As used herein and in the appended claims, unless otherwise specifically denoted, the term "customer" will be used to refer to any authorized entity that logs into the web-based application and accesses information related to an order of commodity. Exemplary, but not exclusive, customers include, brokers, retailers, individual buyers, inspectors, shippers, growers, regulatory agencies, and others involved in the supply chain of the commodity.

It will be recognized that the systems and methods described herein may be applied to any type of commodity and are not limited to produce only. For example, the systems and methods described herein may be used to keep track of and access information regarding the production, processing, inspection, and/or shipment of any type of produce (e.g., fruits and vegetables), grain, meat, livestock, or other food product. However, for illustrative purposes only, produce will be used in the examples described herein.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
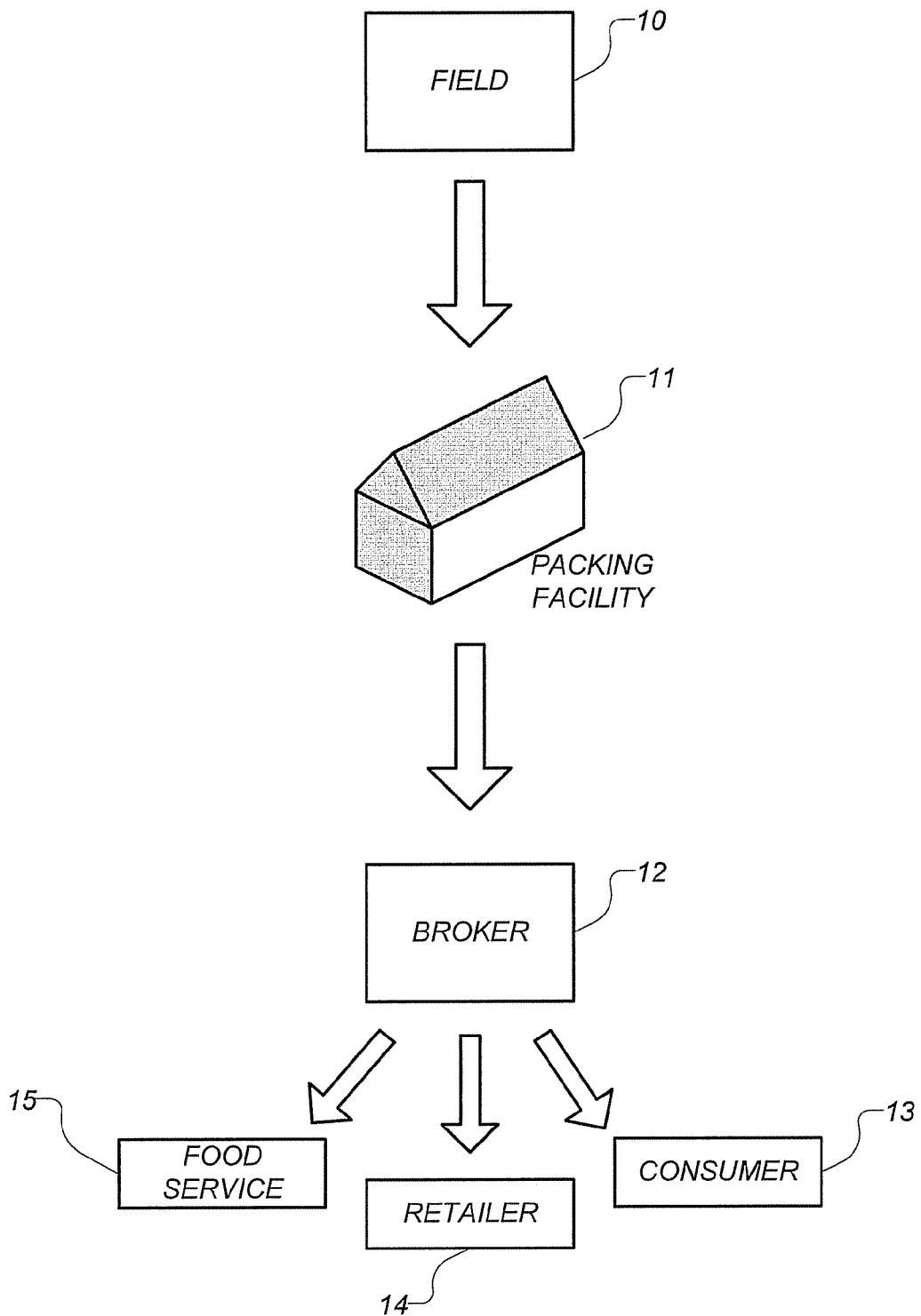
FIG. 1 illustrates an exemplary supply chain or path that produce may take in route to an end consumer according to principles described herein.

FIG. 1 illustrates an exemplary supply chain or path that produce may take in route to an end consumer. As shown in FIG. 1, the produce is first grown in a field (10) or in any other suitable environment. The produce is then harvested and taken to a packing facility (11) where it is processed and packed for shipment to various destinations. The packing facility (11) is also known as a packing shed or a packing house. In some alternative examples, harvested produce is first taken to a storage facility where it is stored for a period of time prior to being taken to the packing facility (11).

Packing facility operations may vary depending on the particular produce being processed. For example, packing facility operations may be as simple as moving produce from a field lug into a shipping container. Alternatively, packing facility operations may include a variety of handling practices including, but not limited to, cleaning, waxing, sizing, quality grading, color sorting, and inspecting.

Produce is often inspected at the packing facility (11) by a United States Department of Agriculture (USDA) inspector. Alternatively, many packing facilities (11) now participate in the USDA's Customer Assisted Inspection Program (CAIP). Under CAIP, a packing facility (11) hires its own internal inspector that has been certified by the state to inspect produce. The inspector's work is reviewed periodically by a USDA certified state inspector to ensure that inspection procedures are properly followed. The inspection procedure and other packing facility operations will be described in more detail below.

Once the produce has been processed in the packing facility (11) and packed, it is transported to various buyers. Produce is often bought by a broker (12), which, in turn, distributes the produce to various end consumers (13), retailers (14), or other food service entities (15). In some alternative arrangements, the packing facility (11) serves as a broker and distributes the produce directly to the customers.

As mentioned, produce buyers often desire access to information concerning the production, processing, inspection, and transportation of the produce that they purchase. This information includes, but is not limited to, load quantities, pricing, tracing information (i.e., information describing the grower of the produce and the particular field where the produce was grown), inspection report summaries, transport vehicle information, and images of the produce while still in the processing stage.

Figure 2:
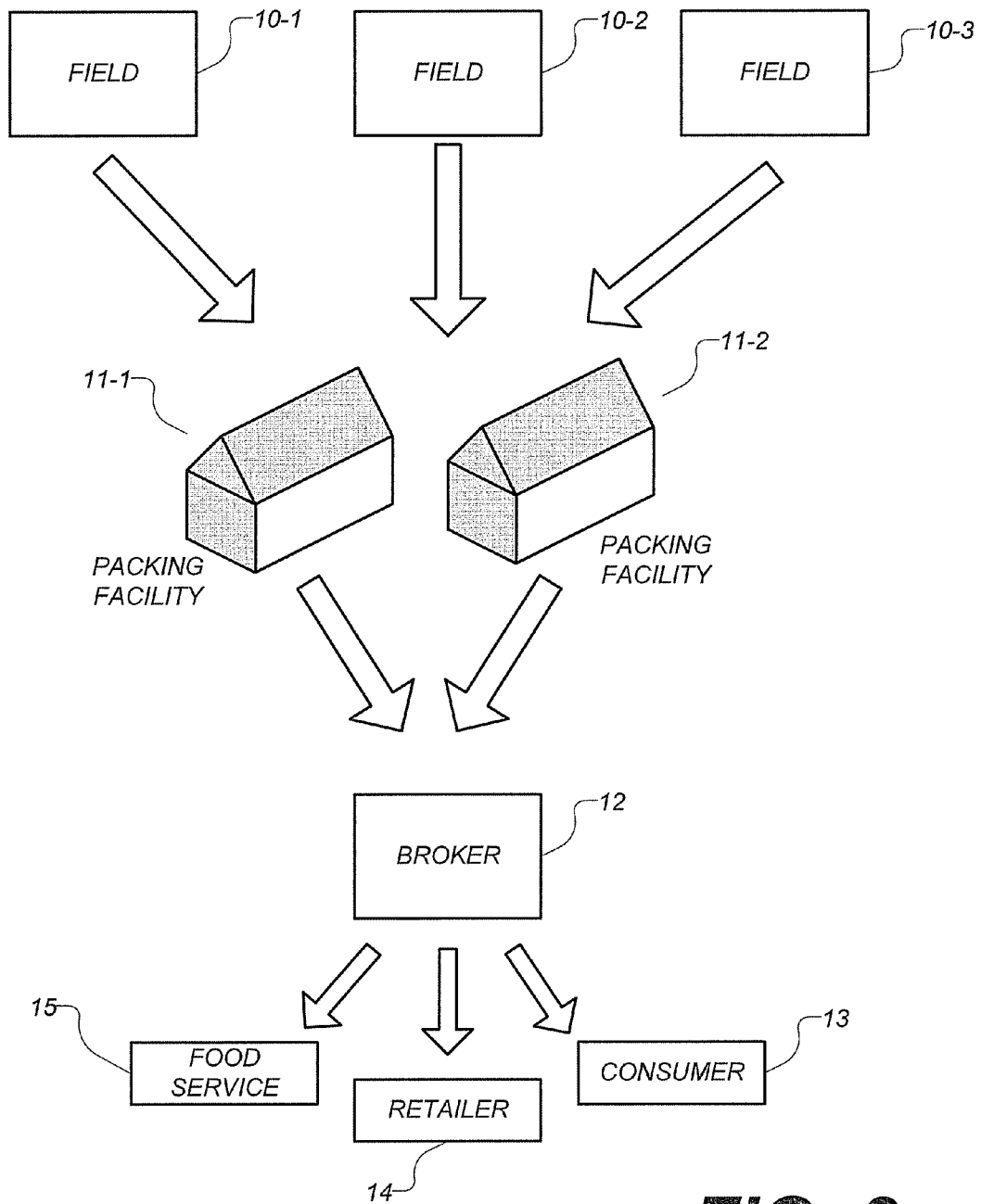
FIG. 2 illustrates multiple exemplary supply chains that produce may take in route to an end consumer according to principles described herein.

However, as shown in FIG. 2, a particular piece of produce that is sold to a broker (12) or a retailer (14), for example, may originate in one of many different fields (e.g., 10-1 through 10-3), be processed in one of many different packing facilities (e.g., 11-1, 11-2), and take one of many different transportation routes before it arrives at its final destination. Moreover, each packing facility (11) may use different recording, tracking, and inspection procedures. For these reasons, accessing desired information corresponding to produce once it is processed and shipped is often a difficult and lengthy process.

Hence, the systems and methods described herein may be used to standardize the recording procedures used by growers, packing facilities, inspectors, and shippers so that buyers may have real-time access to information related to the production, processing, inspection, and transportation of the produce that they purchase. As will be described in more detail below, a web-based application may be used to trace produce and to give produce buyers real-time access to information related to their purchase order.

Figure 3:
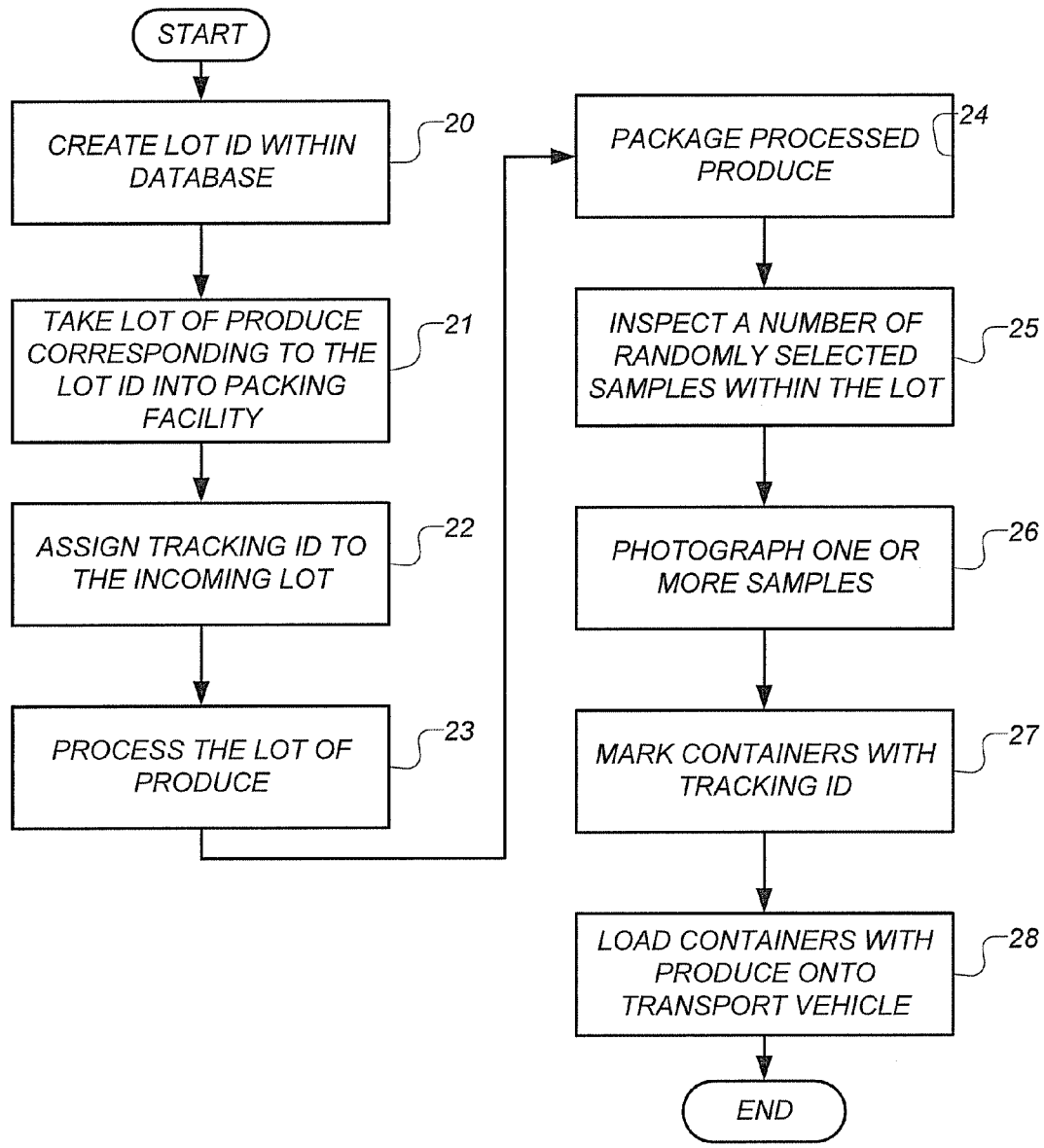
FIG. 3 is a flow chart illustrating an exemplary packing process that may be used within a packing facility to facilitate real-time access to processing, shipping, tracing, and inspection information corresponding to a lot of produce that is processed within the packing facility according to principles described herein.

FIG. 3 is a flow chart illustrating an exemplary packing process that may be used within a packing facility to facilitate real-time access to processing, shipping, tracing, and inspection information corresponding to a lot of produce that is processed within the packing facility. It will be recognized that the steps shown in FIG. 3 are merely exemplary and that they may be modified, reordered, added to, and/or removed as best serves a particular application. As shown in FIG. 3, a "lot identification" (lot ID) corresponding to a particular lot of produce to be processed in the packing facility is created within a central database (step 20). As used herein and in the appended claims, unless otherwise specifically denoted, the term "lot" will be used to refer to a particular batch or quantity of produce of the same kind that is taken to the packing facility to be processed. The lot ID may include any number of characters as best serves a particular application.

The central database used in connection with the process of FIG. 3 may created within any database application as best serves a particular application. Exemplary database applications that may be used include, but are not limited to, Fox-Pro™, Structured Query Language (SQL), and Microsoft™ Access™.

In some examples, the lot ID is linked within the central database to one or more lot attributes. For example, the lot ID may be linked to digital photographs, videos, or other multimedia presentations of the grower of the produce, the field where the lot of produce is grown, and the packing facility where the lot of produce is processed. Text describing the grower, field, packing facility, and/or third party audits of the produce may be additionally or alternatively be linked to the lot ID. The text may include, but is not limited to, the name of the grower, global positioning satellite (GPS) coordinates of the field, seed variety information, a description of the packing facility, and/or any other applicable information.

Additionally, according to one exemplary embodiment, the text may be linked to a third party information website. For example, the text may include a link to a third party mapping service such as GOOGLE MAP, YAHOO MAPS, or MAPQUEST that provides a geographical map identifying the location of the field. According to this exemplary embodiment, the lot ID is linked to coordinates of the field location. When the link to the third party mapping service is selected, the coordinates are automatically entered into the query page of the third party mapping service, providing the desired map/photos.

As mentioned, text or multimedia presentations describing third party audits of the produce may additionally or alternatively be linked to the lot ID. Third party audits allow end customers to verify that the grower or shipper is using "good agricultural practices" and "good handling practices." The audits may be performed by any third party, e.g., Primus Labs.

As shown in FIG. 3, the lot of produce corresponding to the lot ID is then taken into the packing facility to be processed (step 21). A tracking ID may then be assigned to the incoming lot within the central database (step 22). As will be described in more detail below, the tracking ID may be used anywhere in the supply chain to trace the lot of produce back to the packing facility and to the field in which the lot of produce was grown.

In some examples, the tracking ID is referred to as a run number and includes the date and order in which the lot is processed in the packing facility. For example, if the lot is the first lot to be processed in the packing facility on April 18 of a given year, it may be assigned a tracking ID of Apr. 18, 2001.

In some examples, the tracking ID may additionally or alternatively include a USDA positive lot identification (PLI) number. USDA PLI numbers are issued by the USDA to inspected lots of produce and are used to trace produce that is in commerce back to its packing facility. In some examples, the USDA PLI number is linked to the lot ID within the central database so that it may also be used to trace the produce back to the field in which it was grown.

In some alternative examples, both a run number and a USDA PLI number are assigned to an incoming lot of produce. A separate run number is advantageous in some instances because it may be easier for workers in the packing facility to work with run numbers rather than USDA PLI numbers. However, it will be recognized that run numbers and USDA PLI numbers are merely illustrative of the many different types of tracking numbers that may be assigned to an incoming lot of produce.

FIG. 4 is a screen shot of an exemplary software program that may be used by a packing facility worker to assign a tracking ID to an incoming lot of produce within the central database. As shown in FIG. 4, the packing facility worker may be presented with a number of additional input fields for each lot of produce processed. For example, the worker may additionally enter the date, lot ID, and/or various details regarding the particular lot of produce being processed.

Returning to FIG. 3, the lot of produce is then processed (step 23). As mentioned, the produce may be processed in a variety of different manners. For example, the produce may be cleaned, waxed, sized, quality graded, and/or sorted.

After the produce has been processed, it is packaged into containers (step 24). Once packaged, random samples of the produce within the lot are inspected by an inspector (step 25). As mentioned, the inspector may be an internal inspector hired by the packing facility. Alternatively, the inspector may be a government inspector assigned to the packing facility. A number of different qualities of the produce may be inspected depending on the particular type of produce being processed. For example, the inspector may ensure that the produce has been properly sorted and labeled by weight, color, quality, and/or grade.

Figure 5:
FIG. 5 is a screen shot of an exemplary produce inspection software program that may be used by an inspector to enter an inspection report into the central database according to principles described herein.

In some examples, the inspector enters an inspection report into a software program that is linked to the central database. In this manner, the inspection report may be linked to a particular tracking ID within the central database. For example, FIG. 5 is a screen shot of an exemplary produce inspection software program that may be used by an inspector to enter an inspection report into the central database. As shown in FIG. 5, the program allows the inspector to enter the tracking ID of the inspected samples; information identifying the inspector; and information corresponding to the brand, weight, color, quality, and/or grade of the produce. In some examples, the software program automatically date and time stamps the entry made by the inspector.

Returning to FIG. 3, a digital photograph of one or more samples within the lot of produce may also be taken (step 26). In some examples, the first sample within the lot of produce that is processed is photographed. Additionally or alternatively, one or more of the samples that are inspected are photographed. The photographs may then be stored and linked within the central database to the tracking ID.

Figure 6:
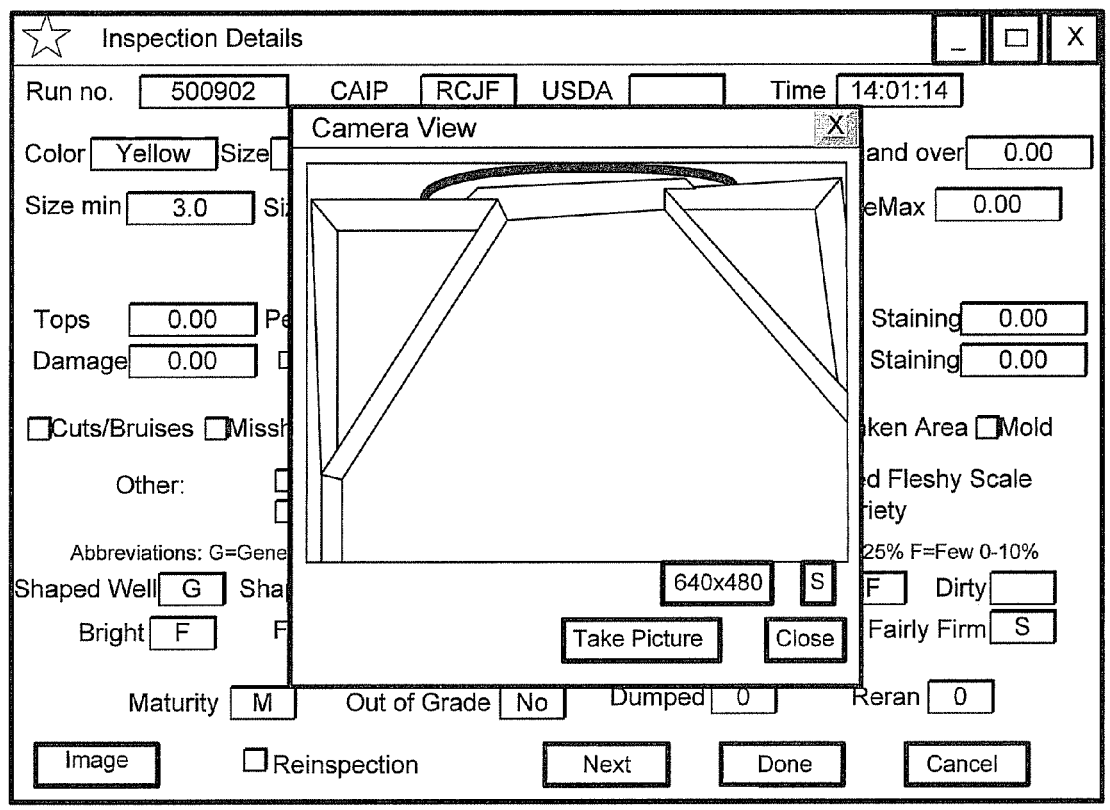
FIG. 6 is a screen shot illustrating an exemplary program that may be used to take digital photographs of the produce according to principles described herein.

In some examples, the camera that is used to take the digital photographs of the produce is controllable via a computer software interface. For example, as shown in FIG. 5, the software program used to inspect the produce may also include a button (50) that may be selected to activate a program that is used to take the digital photographs. FIG. 6 is a screen shot illustrating an exemplary program that may be used to take digital photographs of the produce.

In some examples, digital video of one or more samples within the lot of produce may additionally or alternatively be taken and linked to the tracking ID. For example, digital video may record some or all of the processing of a particular sample of produce in the packing facility.

Returning to FIG. 3, the containers are then marked with the tracking ID and/or other desirable information (e.g., lot and quantity information) (step 27). In some examples, the marking includes a bar code, radio frequency ID, or any other tagging system identifier.

In some examples, the marking information is printed on a tag that is affixed to each container. Additionally or alternatively, the marking information may be stamped or otherwise printed directly on each container.

In some examples, the marking information is affixed directly to each piece of produce within an order (e.g., a sticker is affixed to each piece of fruit within an order). However, it will be recognized that in some instances, it is too labor intensive to mark each individual piece of produce or even each individual container within an order. Hence, the marking information may alternatively be affixed to one or more pallets of containers in a particular order.

The containers of produce may then be loaded onto a transport vehicle (e.g., a truck, ship, airplane, etc.) (step 28) and transported to one or more buyers who have placed orders for various quantities of produce. Each order is assigned a purchase order (PO) number within the central database.

In some examples, the tagging system identifier (e.g., the bar code) corresponding to the containers in a particular purchase order is scanned into the central database as the containers are loaded onto the transport vehicle to fulfill the purchase order. In this manner, the purchase order number may be linked to the tracking ID within the central database. Additional information, such as the quantity of produce included within the shipment, may also be linked to the tracking ID within the central database.

After a Bill of Lading is completed with the operator of the transport vehicle, the order may then be finalized by a shipping clerk within the central database. In this manner, as will be described in more detail below, a customer may see via the Internet that his or her order has shipped almost as soon as the produce is loaded onto the transport vehicle.

Figure 7:
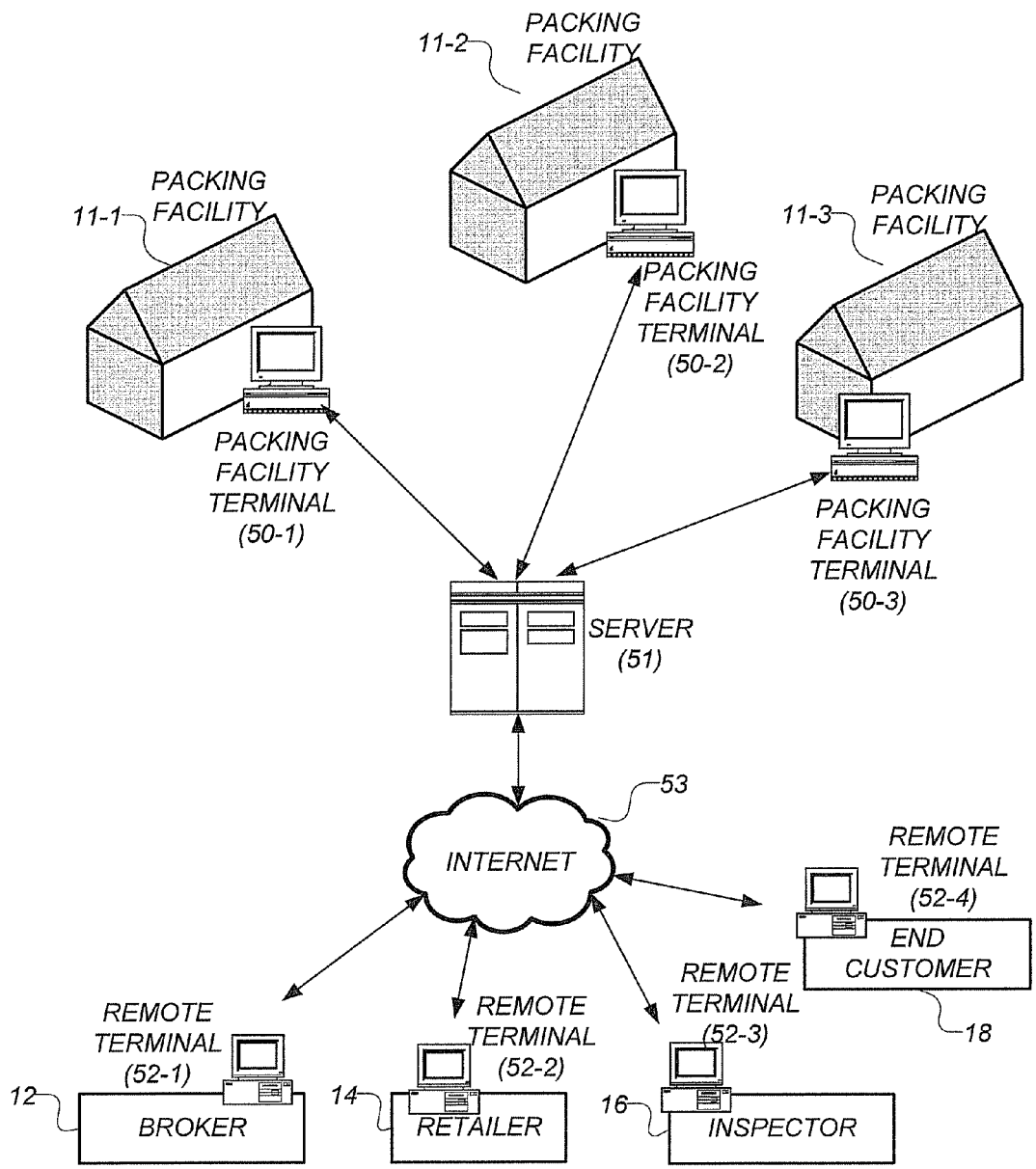
FIG. 7 illustrates an exemplary system whereby a customer may access information regarding a pending or already placed produce order via the Internet or any other type of networking configuration according to principles described herein.

FIG. 7 illustrates an exemplary system whereby a customer may access information regarding a pending or already placed produce order via the Internet or any other type of networking configuration. The information may include, but is not limited to, sales, shipping, tracing, inspection, and other load information. As shown in FIG. 7, a packing facility terminal (50) may be located at a number of different packing facilities (11-1 through 11-3). Information regarding the production, processing, and inspection of an order of produce at each packing facility (11) is entered into the central database using the packing facility terminals (50) as described above in connection with FIGS. 3-6. This information is stored on a central server (51) which may also be located at any suitable location. The server (51) is connected to the Internet (53) or any other suitable network.

As shown in FIG. 7, any authorized customer or other entity that is also connected to the Internet (53) may access the information stored on the server (51). For example, a broker (12) may access the information stored on the server (51) using remote terminal (52-1), a retailer (14) may access the contents of the server (51) using remote terminal (52-2), an inspector (16) may access the contents of the server (51) using remote terminal (52-3), and/or an end customer (18) may access the contents of the server (51) using remote terminal (52-4).

It will be recognized that the information entered at each packing facility (11) may alternatively be stored in separate databases residing at the packing facilities (11). Information stored in these separate databases may be accessed by querying each separate database instead of querying a central database. In some alternative examples, the information may be stored on separate databases residing at the packing facilities (11) and in a central database located at the server (51). In this manner, desired information may be accessed by querying the packing facility databases directly or by querying the central database.

Each of the terminals (50, 52) shown in FIG. 7 may include any suitable computing device configured to be connected to the Internet (53). For example, the terminals (50, 52) may include, but are not limited to, personal computers, personal digital assistants (PDAs), and cellular phones. In some alternative examples, a customer without a connection to the Internet (53) may access information regarding a produce order by using an automated telephone system.

As mentioned, an authorized customer may access the information stored on the server (51) via a web-based application. In some examples, the contents of the web-based application are continuously updated with the contents of the database so that the information seen on the web-based application is always current. In some alternative applications, the contents of the web-based application are updated periodically as best serves a particular application.

In some examples, the web-based application is maintained by a produce facility, broker, or other entity. The customer may be given a username and password and may then login and view information specific to his or her produce order. An exemplary web-based application configured to provide information regarding a produce order will now be described. It will be recognized that the web-based application described herein is merely illustrative of the many different web-based applications that may be used to provide access to information regarding a produce order to a customer or to any other authorized entity.

Figure 8:
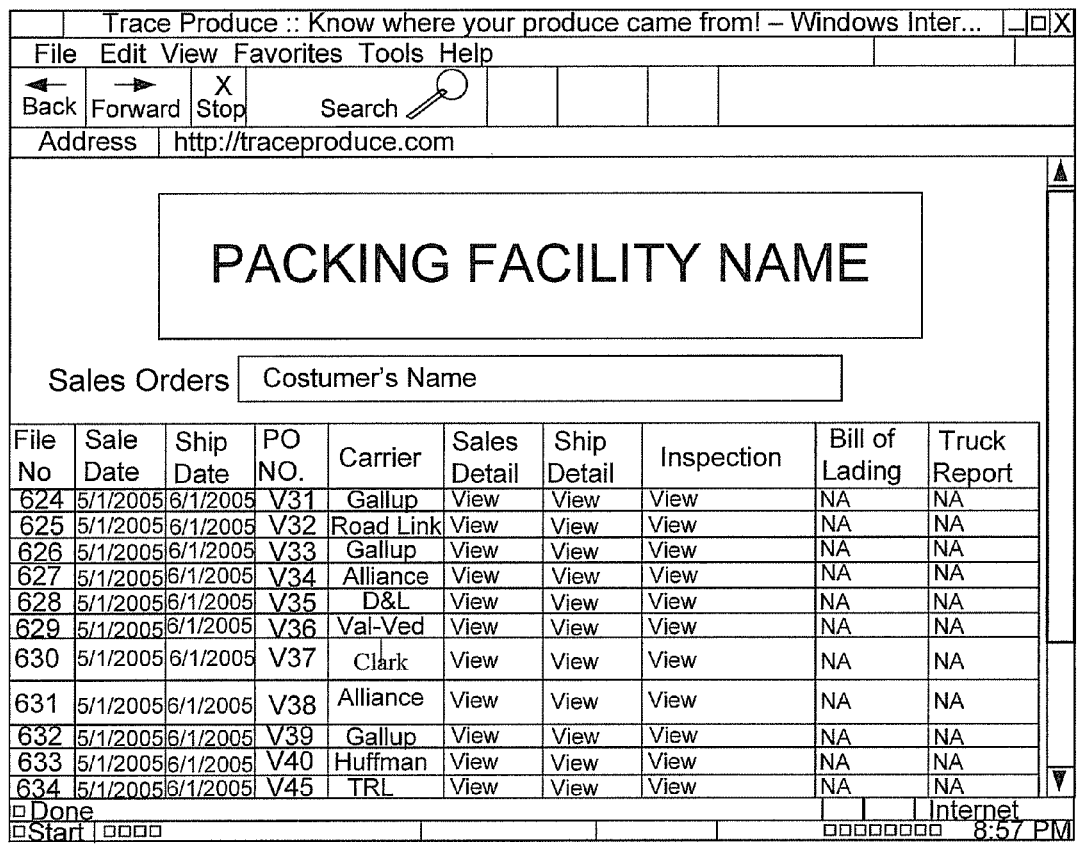
FIG. 8 is a screen shot illustrating a sales orders summary web page that appears after a customer logs on to the web-based application according to principles described herein.

FIG. 8 is a screen shot illustrating a sales orders summary web page that appears after a customer logs on to the web-based application. As shown in FIG. 8, the web page gives a summary of all the customer's sales orders within a given time frame. Each sales order includes a file number (a number assigned to the order by the central database), a sales date, a ship date, a purchase order (PO) number, the name of the transport carrier, a link to view the order's sales details, a link to view the order's shipping details, a link to view the inspection report summary corresponding to the order, a link to view the Bill of Lading corresponding to the order, and a link to view a report of the transport vehicle (e.g., a truck). In some examples, the customer may sort the information shown in the sales orders web page by file number, sale date, ship date, or PO number.

In some examples, the customer may desire to view detailed information regarding a particular order. For example, the customer may desire to view the inspection report summary corresponding to the order having the file number of 62247. To do so, the customer selects the "View" link under the "Inspection" heading corresponding to the file number 62247. Upon selecting the "View" link, a detailed inspection report summary may appear on the screen.

FIG. 9 is a screen shot of a web page showing an exemplary inspection report summary. As shown in FIG. 9, the inspection report summary may include information regarding the inspection of all the different brands or products within the selected order and is derived from the information entered into the central database by the inspector at the packing facility. The inspection report summary shown in FIG. 9 corresponds to an order of onions for illustrative purposes only. It will be recognized that the information included within the inspection report summary may vary depending on the contents of the order and the information provided by the inspector.

In some examples, the customer may desire to view the details regarding the inspection of a specific sample of produce within the order. Hence, a link (not shown) to the full inspection note sheets that are averaged together the obtain the inspection report summary of FIG. 9 may also be included on the web page shown in FIG. 8. By selecting this link, an image of a full inspection note sheet may appear on the screen. The contents of the full inspection note sheet may vary as best serves a particular type of produce being inspected.

Returning to FIG. 8, the customer may alternatively desire to view the sales details for a particular order of produce (e.g., file number 62247). To do so, the customer may select the "View" link under the "Sales Detail" heading corresponding to the file number 62247. Upon selecting the "View" link, a sales details summary for the selected order appear on the screen.

Figure 10:
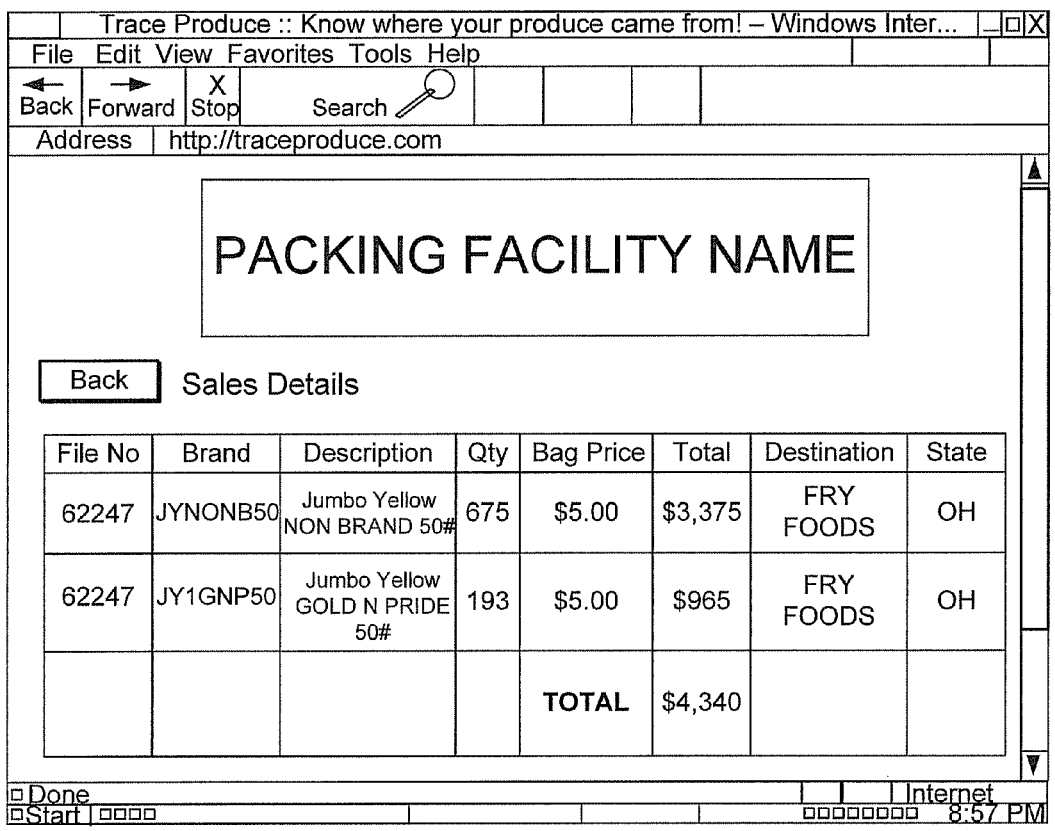
FIG. 10 is a screen shot of a web page showing an exemplary number of sales details corresponding to a selected order according to principles described herein.

FIG. 10 is a screen shot of a web page showing an exemplary number of sales details corresponding to a selected order. As shown in FIG. 10, the sales details summary may show the name of each brand of produce included within the order and description, quantity, pricing, and shipping destination information for each of the brands included within the order.

For example, as shown in FIG. 10, the order having the file number 62247 includes two different brands of onions. The first brand is called JY1NONB50 and the second brand is called JY1GNP50. The order includes 675 bags of the first brand at $5.00 per bag and 193 bags of the second brand at $5.00 per bag for a total purchase price of $4,340.00. Each brand is destined for "Fry Foods" in Ohio.

Once an order has been entered into the central database, its corresponding sales details are available to be seen via the web-based application. Hence, in some examples, the customer may access the sales details of an order before it is shipped to verify that the order is correct.

It will be recognized that the web page configuration shown in FIG. 10 is merely illustrative of the many different web page configurations that may be used to show the sales details for a particular order. The sales details may include additional or alternative information as best serves a particular customer or type of produce.

Returning to FIG. 8, the customer may alternatively desire to view the shipping details of a particular order (e.g., file number 62247). To do so, the customer may select the "View" link under the "Ship Detail" heading corresponding to the file number 62247. Upon selecting the "View" link, the shipping details of the selected order appear on the screen.

Figure 11:
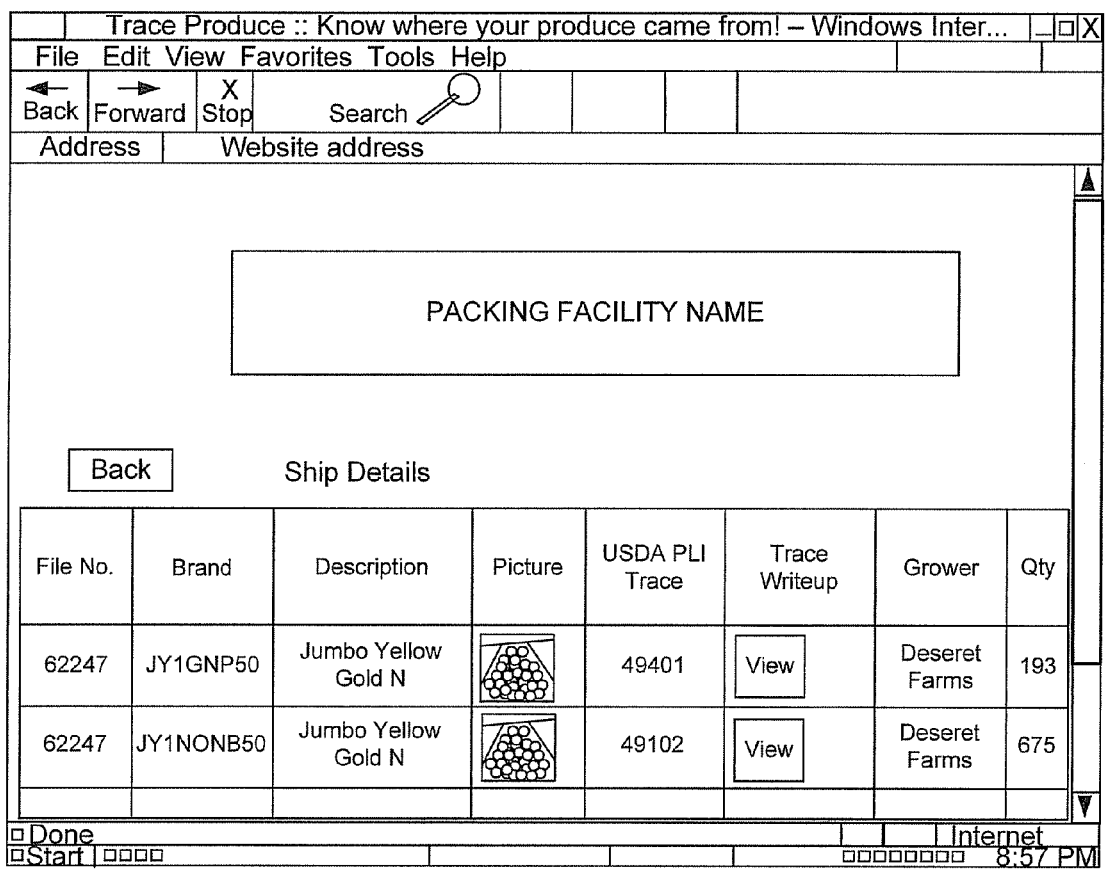
FIG. 11 is a screen shot of a web page showing an exemplary number of shipping details of a particular order according to principles described herein.

FIG. 11 is a screen shot of a web page showing an exemplary number of shipping details of a particular order. As shown in FIG. 11, the shipping details web page may show a digital picture of one or more samples of each brand of produce within the selected order, a tracking number (e.g., the USDA PLI number) for each of the brands within the order, and quantity information for each of the brands within the order.

For example, as shown in FIG. 11, the customer may see that the brand labeled as JY1 GNP50 has a USDA PLI number of 49401 and was grown at Deseret Farms. Likewise, the brand labeled as JY1NONB50 has a USDA PLI number of 49102 and was grown by Ken Nelson.

It will be recognized that the shipping details web page configuration shown in FIG. 11 is merely illustrative of the many different web page configurations that may be used to show the shipping details of a particular order. The web page may include additional or alternative information as best serves a particular customer or type of produce. For example, the shipping details web page may include link to a digital video of the produce being processed and/or inspected within the packing facility.

The shipping details web page of FIG. 11 may additionally or alternatively include a link to another web page that shows additional tracing information corresponding to each of the brands of produce within the order. To view this tracing information, the customer may select the "View" link under the "Trace Write-up" heading. Upon selecting the "View" link, a detailed description of the field, grower, and/or packing facility may be shown.

Figure 12:
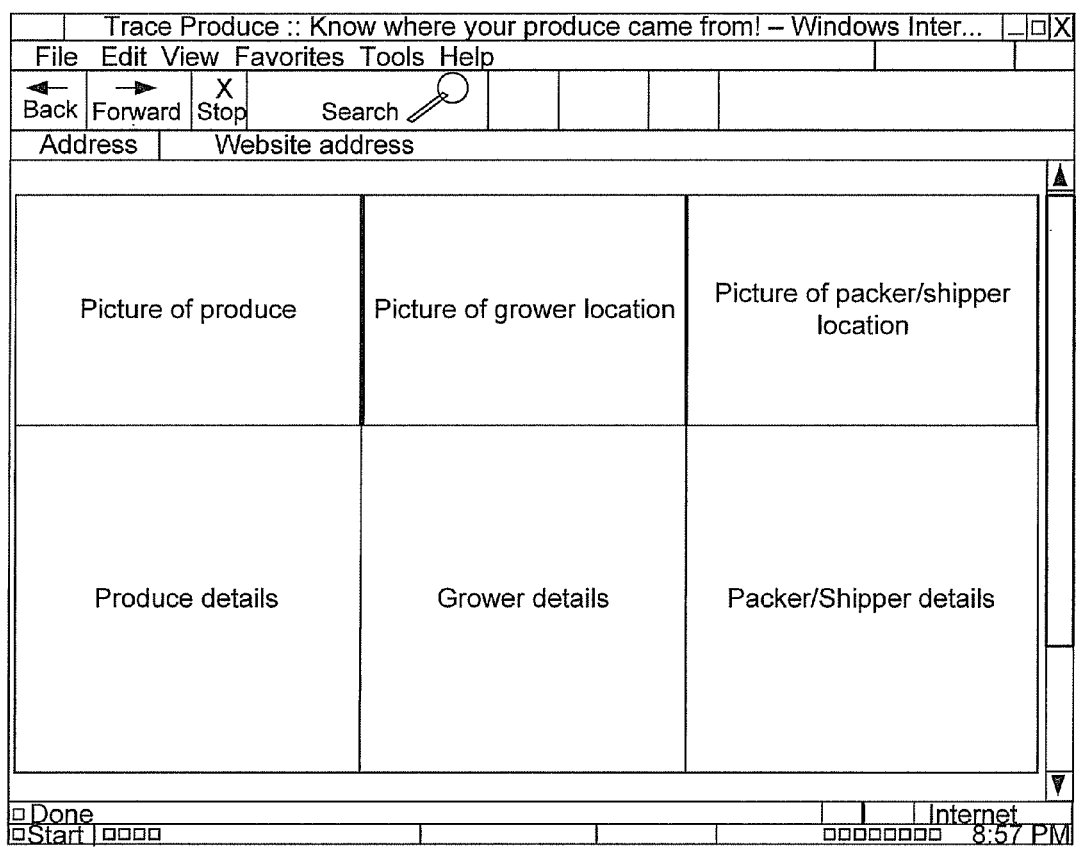
FIG. 12 is a screen shot of a web page showing exemplary tracing information corresponding to a particular order of produce according to principles described herein.

FIG. 12 is a screen shot of a web page showing exemplary tracing information corresponding to a particular order of produce. As shown in FIG. 12, the tracing information may include a picture and/or description of the field in which the produce within the order was grown. The description of the field may include the GPS coordinates of the field and/or a link to an online mapping service showing the field (e.g., Google Earth™). The description of the field may additionally or alternatively include a description of the particular produce grown in the field, the lot ID of the produce grown in the field, and details regarding the planting and harvesting of the produce.

As shown in FIG. 12, the tracing information web page may additionally or alternatively include a picture and/or description of the grower of the produce. The tracing information web page may additionally or alternatively include a picture and/or description of the packing facility where the selected order of produce was processed.

It will be recognized that the tracing information web page configuration shown in FIG. 12 is merely illustrative of the many different web page configurations that may be configured to show tracing information such as descriptions of the field, grower, and packing facility corresponding to the produce in a particular order. The summary may include additional or alternative information as best serves a particular customer or type of produce such as, but not limited to, Lot IDs and seed variety information.

In some examples, some or all of the information shown in any of the web pages of FIGS. 8-12 may be customized, reformatted, and/or omitted for a particular customer. For example, a broker may desire to restrict access to pricing information regarding a particular order for end customers (e.g., retailers). In this example, the sales details web page shown in FIG. 10 may be configured to hide pricing information and only show quantity information for each brand of produce within an order when accessed by an end customer.

Hence, the web-based application described in connection with FIGS. 8-12 may be used to quickly access information at any point along the supply chain corresponding to all of the produce that is processed in one or more packing facilities. The information may be sorted and viewed by packing facility, lot ID, tracking ID, USDA PLI number, customer, drop location, broker, field, grower, inspector, inspection results, harvest date, processing date, packing date, shipping date, shipping company, price, quantity, brand, type of produce, or by any other category as desired.

Moreover, the web-based application described in connection with FIGS. 8-12 may be used to standardize the various tracing methods used by different packing facilities. In other words, all the information is input into the central database in the same manner in each packing facility. In this manner, every entity throughout the supply chain may be able to access the same information regarding specific orders of produce, specific packing facilities, specific growing fields, etc.

In some examples, the web-based application described herein may also be used by a government inspector to ensure that proper procedures are followed by on-site inspectors. The government inspector may be a state or federal inspector. The government inspector may access and sort inspection summaries by packing facility, customer, order number, onsite inspector name, product, brand, date, etc. The web-based application saves the government inspector considerable time and resources by allowing him or her to access the information via the Internet.

For example, a government inspector may desire to access information regarding inspections of specific samples of produce within a lot of produce that is processed at a particular packing facility. If all the packing facilities use the present systems and methods to input processing and inspection information into the central database, the government inspector may use the web-based application to quickly access the desired inspection information, regardless of the packing facility where the produce was processed.

The web-based application described herein may also be used by a government agent to trace a product back to its corresponding packing facility and/or field where it was grown. For example, if a certain product in a particular grocery store is found to be contaminated, a government agent or onsite inspector may quickly determine where the product was grown and where it was processed prior to shipping by using the tracking number (e.g., the USDA PLI number) to query the web-based application to display tracing information corresponding to the product. If it is determined that the contamination occurred at the packing facility, for example, the government agent may then use the web-based application to quickly determine the location of all other produce processed at that packing facility so that the produce may also be tested, quarantined, or otherwise dealt with. In this manner, acts of bioterrorism, contamination, or any other problem associated with produce may be quickly remedied.

According to one exemplary embodiment described herein, the present exemplary system and method may be used to allow a customer to enter a trace code on a website and pull up all information regarding the grower, field, and packer of the product. Additionally, as will be described in further detail with reference to FIGS. 13A through 15, the present system will allow for assigning a sample picture for each trace code lot and to link all the trace codes associated with a single lot so that every order associated with a single lot may be identified if desired. Further details are provided below.

Figure 13A:
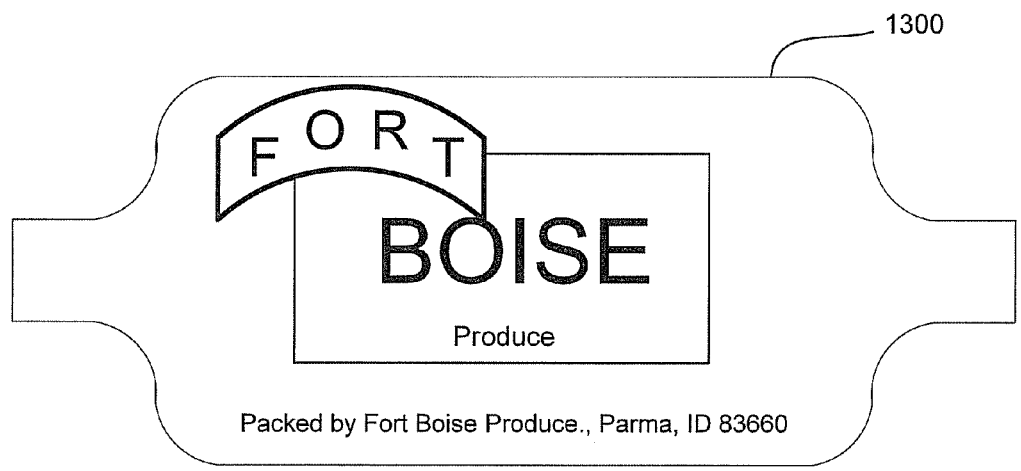
FIGS. 13A and 13B illustrate both sides of an exemplary packing label including a lot ID, according to one exemplary embodiment.
Figure 13B:

As mentioned previously, according to one exemplary embodiment, the marking information including a lot identification number may be affixed to each piece of produce within an order. Alternatively, each bag or other container of the produce may include a sticker or a tag including the lot identification number. FIGS. 13A and 13B illustrate a front and a back, respectively, of an exemplary tag (1300), according to one exemplary embodiment. As shown in FIG. 13A, the front of the tag (1300) may include source indicating information including, but in no way limited to information related to the packing facility or broker sourcing the product.

As shown in FIG. 13B, the back side of the exemplary tag (1300) may include further product identifying information including, but in no way limited to, product type, weight, and a system barcode. Additionally, as illustrated, the exemplary tag (1300) may include a lot identification component (1310). Moreover, as shown in FIG. 13B, an HTML address or other identifier indicating where the customer portal configured to receive the lot identification component can be found may bed disposed on the exemplary tag (1300). While the exemplary tag (1300) illustrated in FIGS. 13A and 13B illustrates the lot identification component on the back side of the tag, the exemplary lot identification component may be on any surface.

Figure 14:
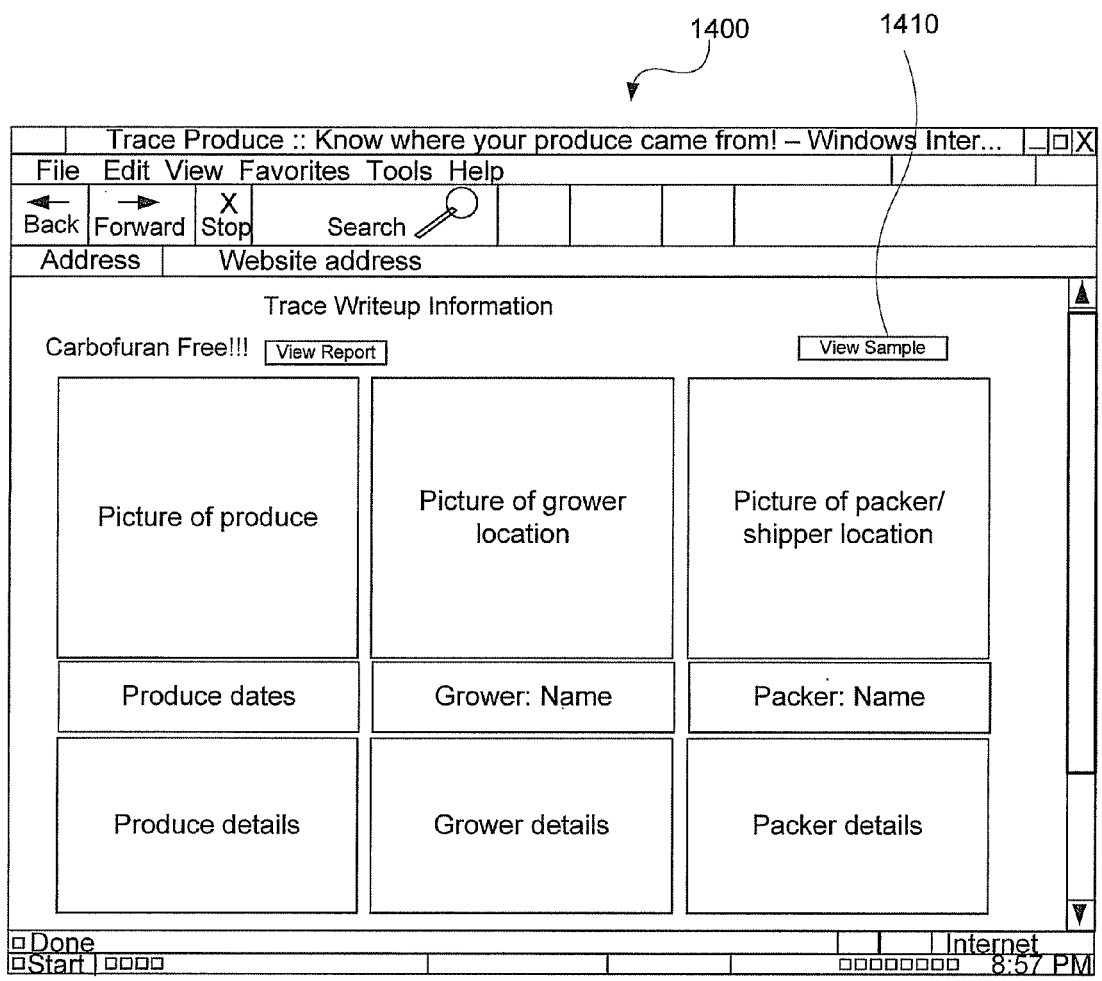
FIG. 14 is a screen shot of a web page showing an exemplary trace information page in response to entering a lot ID, according to one exemplary embodiment.

According to one exemplary embodiment, when the lot identification component (1310) is entered into a customer portal, information related to the products assigned the lot identification component is displayed. As illustrated in FIG. 14, after the lot trace code or other lot identification component is entered into a customer portal (not shown), a trace write up (1400) or other desired information may be displayed to the customer. As illustrate in FIG. 14, according to one exemplary embodiment, the trace write-up information displayed after entering the lot identification component (1310) may include, but is in no way limited to, detailed information about the source field of the produce, the source grower of the associated produce, and the packing facility of the associated produce.

Additionally, as illustrated in FIG. 14, a button may be present on the interface that allows a customer to view a sample of the produce associated with the lot identification component (1310; FIG. 13B). Specifically, as mentioned previously, the photographs associated with the inspection programs can be assigned to the lot identification component (1310) such that when the view sample button (1410) is selected, the photograph from the inspection programs associated with the lot is displayed.

In some examples, the produce is additionally or alternatively inspected at a receiving point (e.g., at the broker's place of business or at the retailer's place of business). For example, the federal government has recently established the Fresh Electronic Inspection Reporting/Resource System (FEIRS), which includes an electronic means of recording the inspection summaries prepared by the receiving point inspectors. In some examples, the results of these receiving point inspections are linked to the tracking ID of the produce. In this manner, the receiving point inspection results may also be accessed by customers.

Figure 15:
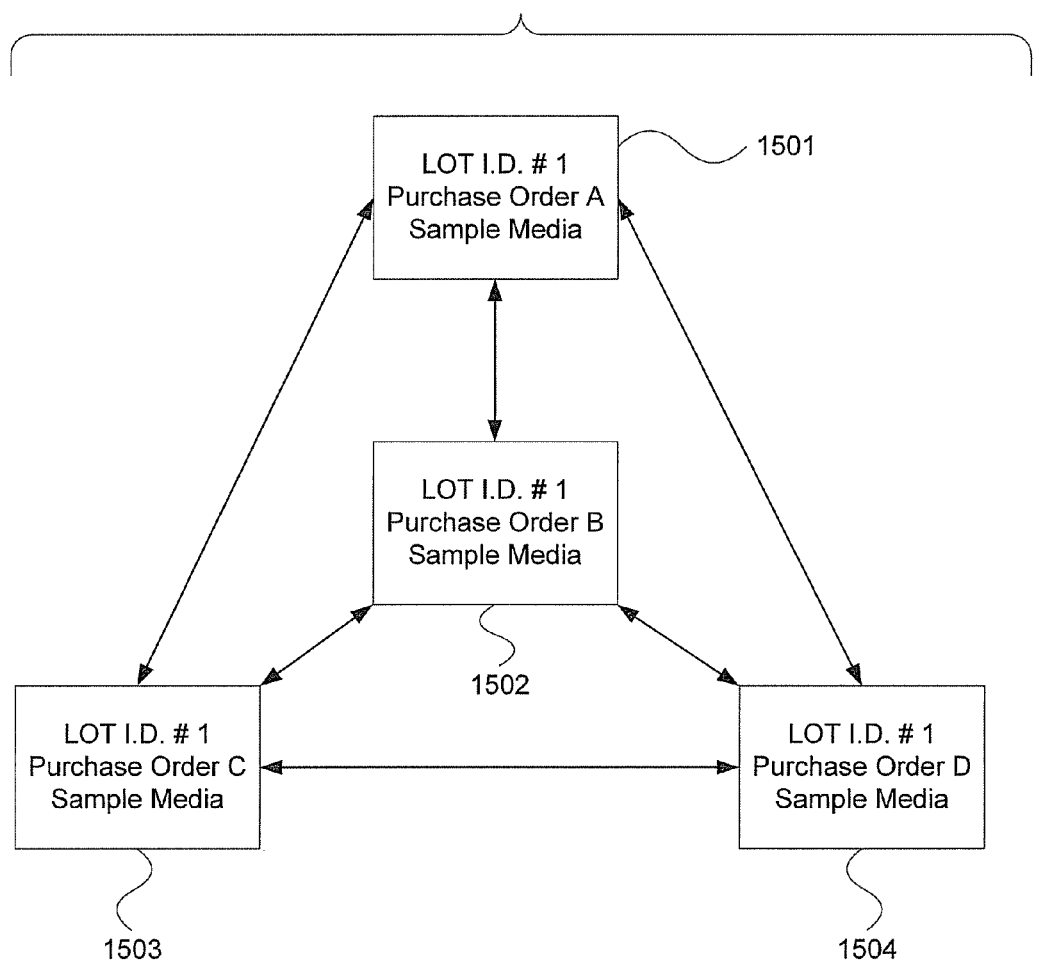
FIG. 15 is a block diagram illustrating a relationship allocation of a lot of produce corresponding to a single lot ID within a server, according to one exemplary embodiment.

Additionally, according to one exemplary embodiment, all of the purchase orders associated with a lot identification component (1310; FIG. 13B) may be linked within the server (51). FIG. 15 illustrates the data structure of the server (15) memory modules, according to one exemplary embodiment. As illustrated, multiple purchase orders (1501, 1502, 1503, and 1504) may originate from a single lot, and consequently have the same lot identification component. However, the various purchase orders may be shipped to different locations such as food service locations (15; FIG. 1), retailers (14; FIG. 1), and/or consumers (13; FIG. 1). According to the present exemplary system and method, the various purchase orders stemming from a single lot are linked together within the server (15).

According to the present exemplary embodiment, linking the associated purchase orders stemming from a single lot allows for the rapid identification of all of the orders that are transported from a single lot. For example, if a problem is identified from a single purchase order, such as reports of botulism, *e-coli*, rot, or other difficulties, the purchase orders associated with the entire lot may then be identified and inspected or re-called as the situation merits. For example, according to one exemplary embodiment, a user may enter the USGA code to identify a single order. Once entered, all of the orders related to the entered USGA code will be identified. As illustrated in FIG. 15, each data module representing the individual orders will, according to one exemplary embodiment, include a lot identification component, a purchase order identifier, and a sample media link. According to one exemplary embodiment, the sample media link may include a photograph, audio recording, video presentation, or other multi-media presentation of the grower, facility, and/or inspection. For example, according to one exemplary embodiment, the multi-media presentation may include a video of the grower discussing how a field was planted or cared for, the history of the farm, and/or a discussion of the inspection process and results.

Additionally, according to one exemplary alternative embodiment, the act of entering the HTML address or other identifier found on the exemplary tag (1300) illustrated in FIG. 13B initiates a directed marketing campaign related to the associated produce. According to one exemplary embodiment, the server (51; FIG. 7) identifies the general geographic location of the end customer (18; FIG. 7) via any number of information gathering techniques including, but in no way limited to, requesting general geographical information via a survey or by using the end customer's IP address and the Internet Service Provider information associated with the remote terminal (52-4). According to this exemplary embodiment, once the server (51; FIG. 7) or other remote computing device receives and general geographic location of the end customer (18; FIG. 7), a geographically based targeted advertisement campaign, related to the tracked produce may be launched. According to one exemplary embodiment, the server (51; FIG. 7) identifies the geographic location of the end customer (18; FIG. 7) and identifies what produce is associated with the tracking ID entered. Once the geographic location and the produce are identified, a targeted advertisement campaign can generate advertisements for restaurants in the general geographic area of the end customer (18; FIG. 7) that use the same produce. Alternatively, an advertisement may be presented to the end customer related to recipes for sale that may be made with the identified produce or related objects that the end customer (18; FIG. 7) may have particular interest in.

In addition to the above-mentioned system and method, a number of features related to the creation of an account, the added search features possible with the present exemplary system, the incorporation of alternative packing company's labels and standards, and the incorporation of GS1 (Global Standards one) standards. Further details will be provided below.

Account Creation

During Account Creation, according to one exemplary embodiment, growers and/or shippers will select which months of the year that they are packaging product. Any buyers or customers that these accounts work with can be given access to 'View' if the grower/shipper is updating their site with account codes on a daily/weekly basis for the months selected. This is a way for a customer such as US Foodservice to make sure that their shippers on this system are using it.

Furthermore, according to one exemplary embodiment, during account creation, a facility identification code or number (1600) is established, as shown in FIG. 16. When accessed by a user or an administrator, the account based system utilizes the 'Facility I.D' codes typed in at an initial user interface home page to determine which account to pull from. According to this exemplary embodiment, the facility ID code that is used to determine record accounts can be any number of issued identification numbers including, but in no way limited to, a state issued number, a global identifier for bar codes called a 'GS1 company prefix', or any other identification number. According to this exemplary embodiment, the ability to use a single preliminary identification number to narrow the data search location, the computing resources necessary to identify a desired component of information is greatly reduced. Other important information may include 'Food Safety' contact name and number (1601), as well as the months that a grower/shipper account packs produce.

Furthermore, according to one exemplary embodiment, access of the inspection and shipping information via a trace code may result in the display of additional information. Specifically, according to one exemplary embodiment, when a customer types in a trace code at the main site, they see all maps and videos of where their produce came from. The shipper can also attach marketing 'Sustainability' videos that can show good farming/shipping practices and procedures. Other videos and images that may be attached include stages of the growth cycle—e.g., planting, one month after planting, mid-season, harvest—or of various stages of packing, shipping, or general farming practices. A plurality of videos may be attached to a single lot record such that a user accessing the lot record may access all videos taken of an individual lot. This may be particularly useful in the seed industry or for transplant crops.

According to one exemplary embodiment, videos or pictures may be taken using a laptop or computer through a web-based system, which may be through an account of a shipper, receiver, USDA or other inspector out in a field where packing occurs, in a packing facility, in a re-packing facility, or in a receiving area. In one embodiment, the computer has internet access through a digital subscriber line (DSL) or wireless signal. The operator or inspector takes videos throughout the packing day or at the receiver area, which are then uploaded into the account soon after being taken. The videos or pictures may be uploaded automatically as soon as they are taken so that the users do not have to manually upload the content to their account. Multiple inspection videos may be uploaded within a short amount of time, which will allow the program used to capture the media to stream multiple videos into an account. This functionality may allow an inspector or operator to continuously take videos/pictures of the product without having to wait for a previous video or picture to complete the upload process into the account. Inspection processing hardware devices are not limited to a laptop or other computer, but can also include a handheld device connected to a web camera, another digital camera, and the like. Alternatively, the web-based inspection program may be used without needing an account, as desired. Multiple users may be able to upload content simultaneously to a single account, depending on if multiple users are allowed the appropriate level of access to the account. Inspectors may use blue tooth, or another sound capturing device to record audio to the video that describes the produce. Some packing environments may be too loud to allow the web cam to capture audio from the inspector, resulting in the use of a headset/microphone capturing device.

The videos may, according to one exemplary embodiment, contain sound, close-up views of the produce, views of cut produce to show the internal quality, sizing specifications of the produce, 'Lot Codes' on the produce container, date and time, product codes, the container and brand the produce came in, temperature of the produce, pathogen—*e-coli*—*salmonella* or other test samples being taken, and/or combinations thereof. Such information may be embedded within the video or otherwise. According to one exemplary embodiment, video inspections may also have inspector initials/names and/or certifications of the videos by companies, and/or state or federal agencies (USDA, FDA, CDC, State Departments of Agriculture)—this information would then be included within the video. Inspectors taking videos will be able to include their initials/name with the video, and certify the video based off of the company or agency overseeing the video/inspecting process. Video inspections may also contain information about the lot within the video (Farmer, Field, Packer, etc.). This system would be useful for any commodity, or product. Lot Codes associated with an inspection can be any lot coding format, including USDA PLI, GTIN, GS1-128 barcodes, Facility ID's and Lot Codes, FDA lot coding standards, etc. An inspector may be able to retake a video or picture if so desired, such as if the original has defects that would make the video or picture unsuitable for customers to view. The inspector may also have the ability to cancel an upload or overwrite a previously taken inspection video. If two separate users attempt to upload video with the same Lot Code and Product ID at the same time, the program may flag the second user to let the user know that a video has already been taken, and may give the second user the option to replace the video. Receivers or inspectors may upload a video or picture using a Lot Code found on the shipping container or they can use their own Lot Code. Any and all other additional information can then be added to the inspection video by the inspector (product identifiers can be added to the inspection from the receiving point inspectors list of 'Product ID's, or through access to the shippers list of 'Product ID's').

According to yet another exemplary embodiment, a customer may use a facility code to search for a shipper's account information. That is, each shipper will have a shipper facility number that can be used to trace the source of produce. There are other websites that host just food safety audits and other documentation—thus a user may have the ability to type in a code, or facility I.D. that is found on a package to see the associated products 'shipper account' and all related documentation.

Additionally, according to one exemplary embodiment, a user or customer may be able to view Account Based Inspection Videos/Pictures. Within a shipper's account, they will be given the option to take a video or picture for an inspected sample that will stream into the website. This video or picture may be assigned the trace code found on the package container, as well as a 'Product Identifier (Gold n Sweet 50# Sack)', though the inspection video or picture may be separate from tracing information. Receiving end customers can have a similar option—they can assign a product trace code found on the container to a video or picture. They will also have the option to assign product identifiers to the container as well. A shipper account will then have the option to allow any customer to have access to their inspection video files. As an example, a receiver with account access can simply type in the code on the package, select the corresponding product identifier name, and view the video or picture. If a shipper does not want the receiver to have access to all their inspection videos, the shipper can give them access to just the specific video(s) that they want them to see. As the video or picture is taken, the trace code and/or product identifier, date, and time, etc. can be stamped into the video picture or along side the video or picture. This way there is documentation to verify that the video or picture was actually associated with the specified container and code. By doing this, there is no need to write inspection software programs for every commodity, but there can be one application for all commodities, focusing on the visual inspection process.

According to one example, a user who has uploaded videos or pictures to the website with their account may locate an inspection video and send a link for the video to any member of the supply chain. This will allow buyers, brokers, receivers, inspectors, and others to see a video even if they do not have an account. The video link may be secure so that the recipient is unable to search for other videos from the sender. Account users may also grant other accounts access to view and search for videos within their account. Inspection videos, or accounts may also be accessible by integrating or linking with third party inspections programs such as the USDA Federal Inspection program 'FEIRS'. According to one exemplary embodiment, a user may also link inspection videos to their own company website, or another website that allows buyers to see what produce they have available for sale, and the conditions of the produce. In addition, users may have webcams above their inspection tables that are accessible on an internet site that allows potential buyers to see in real time what types and quality of produce the packing facility has for sale. Both of these examples may be open to the public to view off of a website, or accessible via a secure password system.

According to one exemplary embodiment, some produce containers may be packaged out in the field where there is no internet access. For these accounts, a software program can be uploaded onto a laptop that allows videos or pictures to be taken, and assigned correct 'Lot Codes' and product identifiers. The videos and pictures may be transferred after a certain time interval from the computer or device where they were originally taken onto a USB device or other transferring data storage device and then to a computer or device with internet access. This software will then allow the video or pictures to be uploaded to the corresponding website account. The website where the videos are uploaded will then begin the process of streaming in all of the videos onto a server. This would also work without a USB transferring device if the original computer used to take the videos or pictures is able to be taken from the site without internet access to a place with internet access. As is known in the art, many video applications may be employed to upload video and/or pictures.

Figure 17:
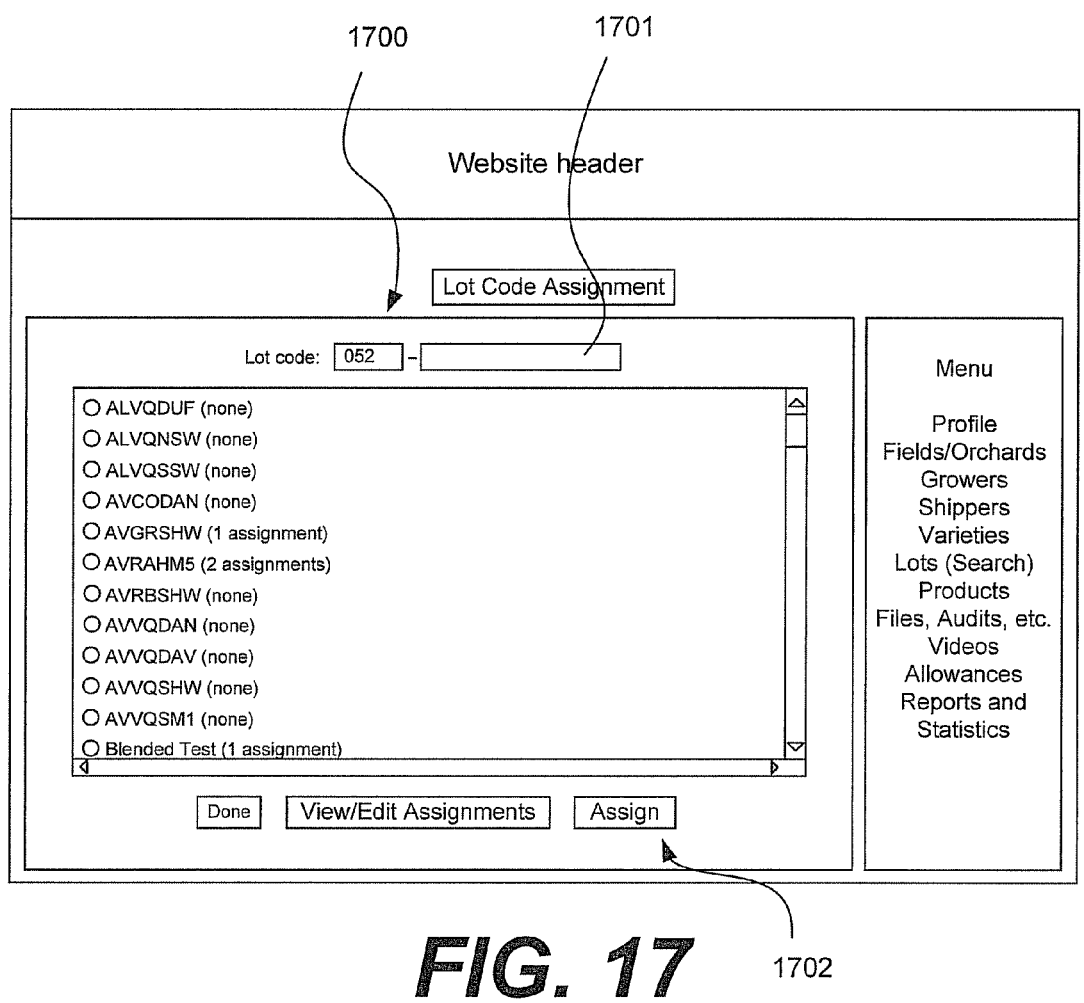
FIG. 17 is a screen shot of a web page showing an exemplary lot code assignment page according to principles described herein.

According to one exemplary embodiment, a database of 'lot records' may be created and a correlating group of 'lot codes' may be assigned to the lot records. According to this exemplary embodiment, information may be assigned to the lot records in any number of methods, by the shippers using any coding system that they select, so long as the "facility identification number" system mentioned above is observed. The embodiment of FIG. 17 shows how an account user may assign lot codes to a particular lot record with its corresponding facility identification code (1700) by entering the lot code into a text box (1701) and thereafter clicking an "Assign" button (1702). Lot code assignments may later be viewed or modified if needed.

In the embodiment where blended lots are provided to make up a single bag or component of produce, the grower/shipper can simply select any number of lot records, and assign them all to the same lot code that went onto a package of produce. (Example code: 034 750).

Similarly, when there is a mixed produce package, such as a fruit cup or a salad bag, that contains produce from a plurality of locations/sources, the grower/shipper can type in the corresponding codes found on produce packages or bulk totes from other suppliers. Each of these codes can then be linked to a new 'Lot Record' and assigned to the final code that was put on the finished product. (Note: these codes do not necessarily have to be linked to a new 'Lot Record', they may just be linked directly to the final code). All information such as food safety documents and other documentation can now be linked to one final code—all previous codes that are linked to the final code can be made available for searching individual shipper accounts. (Example code: 012 750).

Furthermore, a variety of searches can be done based off of a code on a container to obtain documentation, videos, and also finding other codes with similar products based off of specified queries. For Blended, or Mixed Produce packages this will need to hold true for all items within the package—relevant codes and information for each item can be found, and queried for additional information. For shippers that purchase products from a supplier that is not on the present exemplary system, the shipper still has the option to include the supplier information. Since no trace code can be linked to the newly created lot record that the final code will link to, shippers can have data text fields that allow them to type in information about the supplier. This would still allow additional detail to go along with the produce package.

Furthermore, according to one exemplary embodiment, any number affiliated with a barcode on a package of produce can be typed into the search box or boxes at traceproduce.com. The programming for the website will be able to determine the 'Facility Identification' number, and the 'Lot Number' from this barcode #. A 'GTIN (Global Trade Identification Number) on a GS1-128 Barcode may be used to identify the 'Facility Identification' number, and the 'Lot Number' by incorporating a correlation in the database between the GTIN and the 'Facility Identification' number, and the 'Lot Number'. The website will also recognize this barcode number inside accounts when linking produce packages, and querying for specific Lot Codes.

Packing Produce in Another Company's Label

According to yet another exemplary embodiment, any packer/shipper that packs in another customers label will label product with the brand owners GTIN code on the case. Because of this, the shippers GS1 company prefix would not be included in the GTIN portion of the GS1-128 barcode. What a brand owner will do, according to one exemplary embodiment, is to assign a company number to that shipper that represents the shipper internally within the brand owners systems. In some cases this company number may remain the GS1 Company Prefix, and in other cases it will be an internal numbering system. The present exemplary software accounts for instances where the company number remains the GS1 Company Prefix.

Example: Fort Boise packs products for Sysco in the Sysco brand box. These boxes receive a GS1-128 barcode that contains a 14 digit GTIN that references Sysco's GS1 Company Prefix and Reference Number. The second part of the barcode is the Lot Code. Sysco will assign Fort Boise a company number. Fort Boise will include this in the second part of the barcode. This number will appear just before the Lot Code.

Example: Sysco's GTIN is 0012345611110, Sysco's company number for Fort Boise is '123', Fort Boise's Lot Code is '23901'. The resulting GS1-128 Barcode would read as follows: 00123456111101 2323901 (Note: there may or may not be a spacer or dash between 123 and the lot code. Also the facility number may appear after the lot code).

Within Sysco's account at the website incorporating the present exemplary system and method, there will be a place for other accounts (shippers, growers, buyers) to be assigned a number. In the above example, Fort Boise will have been assigned number '123' within Sysco's account. When the following GS1-128 code is typed in at the home page, the present exemplary system will do the following searches:

Step 1. Search within the account of the associated GTIN's GS1 Company Prefix for the full Lot code. This would mean it would look inside Sysco's account for a Lot Code of 12323901. If there is no match the system will then go to the next step.

Step 2. Search within the account of the associated GTIN's GS1 Company Prefix for a corresponding assigned company based off of the first few digits in the lot code. Once a match is found, the system will go to that account, and will then look for the associated Lot based off of the remaining code found on the Lot Code portion of the GS1-128 Barcode.

Re-Packing/Mixed Produce

Lots—Step 1 and Step 2 will occur the same way when re-packing or mixing produce at a facility. If the original case of produce has been labeled with the brand owners GTIN, then the system will do a search the same way to identify which account the associated cases produce information can be found from.

Linking GS1-128 Barcodes and GTINs without Marketing Information

There may be an opportunity for a web-based system that allows packers/shippers to simply type in or scan any GS1-128 barcodes or GTINs, and assign them to a final GS1-128 Barcode or GTIN that was put onto a package of produce. This would allow all re-packed or mixed produce codes to be linked to the final code put onto a package of produce. This system may be account based, or may allow any shipper to simply go onto the site and register a GS1-128 code with all linked codes assigned to it. There may be a limited amount of information available (marketing videos, maps, etc.), but at the least associated codes would be available. Facility Identification numbers may be found from codes to help find which codes represent what shippers.

Implementing GS1 Standards

Breakdown of the GTIN

According to one exemplary embodiment, 14 digit GTIN numbers are incorporated by the present exemplary system. According to this exemplary embodiment, a GTIN number, such as 00123456000013 may be used. According to this exemplary embodiment, the first digit of the GTIN number is an 'Indicator'. The second digit of the GTIN number explains which country the Company Prefix was obtained for. For all U.S. companies, this number should be '0'. The next 11 digits of the GTIN number represent the Company Prefix and the Reference number. The Company Prefix can be 6-9 digits, with the remaining digits being the reference number.

According to one exemplary embodiment the final digit of the GTIN number is a 'Check Digit'.

Additionally, according to one exemplary embodiment, exception codes indicating secondary attributes such as brands, etc. are meant to be used internally by the grower/shipper and are NOT meant to be shown inside the bar code or on an invoice. Therefore, the exception codes will not be relevant to tracing from the GTIN found on the container.

According to the present exemplary embodiment, after the GTIN, a lot code will appear. The Lot Code can be Alpha-Numeric and up to 20 digits in length. It will be shown inside the barcode in addition to the GTIN. In front of both the 14 digit GTIN and the Lot Code will be 'Application Identifiers' which will tell the scanner when it encounters a 14 digit GTIN versus a Lot #.

How the Present Exemplary System will Integrate GS1 Standards

An exemplary GS1-128 Barcode # is: (1) 00123456000013 (10) 23901

The present exemplary system will still use the same format of one standard—The facility identification number. For those accounts using the GTIN, the facility number used for the account will be the GS1 Company Prefix. The system will simply recognize when a GTIN is being input into the search boxes, and will then extract the facility number and the lot code from the GTIN, resulting in the same accessible information.

When the above code is entered into the system incorporating the present exemplary system and method, the system will recognize the first 'Application Identifier—(1)' and will then extract the facility number from the 14 digit GTIN. The system will not, according to one embodiment, recognize the first or second digit. The program will then take the next 6 digits and see if there is a match to the facility within the TraceProduce.com accounts. This matching may be performed by a sequential string compare function or another searching method. If there is not a match, it will look at the next digit to see if there is a 7 digit match, it will continue this process until it has checked nine digits (Note: It is the GS1 company's responsibility to ensure that non sequential prefixes are used, therefore there cannot be a company with the number '123456' and a company with number '1234567'). The system only needs the facility number from the 14 digit GTIN, therefore once the facility number has been found, it will not need to look at the remaining 'Reference' number, or the 'Check Digit'. To extract the Lot Code from the GTIN, the system will look for the second 'Application Identifier—(10)'. It will then search for this lot, based off of the facilities account. The present exemplary system is configured to allow a GTIN without application identifiers, with application identifiers (as seen on a barcode), or as a scanned GTIN.

In one embodiment of the present exemplary system and method, the GTIN, GS1 barcode, or other identification code associated with a particular lot may be printed on stickers and attached to each item of produce in the lot. Thus, on each individual item in a lot may be traced back to its shipper and/or grower by searching the database for the identification number printed on each sticker in order to find the respective lot record and information linked through the website. The website address into which the identification codes are entered may also be printed on the stickers, along with possibly any other logos, product lookup numbers, or trace codes, according to the available information in a given embodiment.

The stickers may be applied to the items as they pass through a packing line sizer or packing line drop belt, with incorporated labeling machines. The packing line sizer labeler may print the same lot code on each sticker associated with a specified lot or the labeler may print an individual number on each item of produce if so desired, which may aid with certain aspects of record-keeping.

It will be recognized that the web-based application described herein may additionally or alternatively be used to access any other type of information corresponding to produce that is processed in one or more packing facilities. For example, a grower may use the web-based application to access pack out and/or inventory information regarding produce that he or she grows or otherwise produces. Such pack out and/or inventory information may include, but is not limited to, bin reports, pack out reports, lot reports, and truck reports. These reports may allow the grower to view how his or her produce is being inspected, processed, and shipped. They may also allow the grower to calculate an expected return on investment due to the packing performance of his or her produce. Web pages may be designed that allow access to such information as best serves a particular application.

The preceding description has been presented only to illustrate and describe embodiments of the invention. It is not intended to be exhaustive or to limit the invention to any precise form disclosed. Many modifications and variations are possible in light of the above teaching. Specifically, while many examples provided above are described in the context of a produce, such as onions, the present exemplary system may be used for the quality assurance and source tracking of any commodity or product including, but in no way limited to, seafood, beef, poultry, textiles, building materials, and the like. It is intended that the scope of the invention be defined by the following claims.

What is claimed is:

1. A system for allowing a customer to access tracing information related to an order of a commodity selected from a source lot, said system comprising:
 a server configured to store said tracing information in a central database, said tracing information including inspection information corresponding to the source lot of said order of said commodity including an inspection photograph or an inspection multi-media recording of said source lot of said commodity and at least one or more of sales information, shipping information, pack out information, and inventory information corresponding to said order of said commodity;
 one or more computing devices having one or more applications configured to enter said tracing information into said central database;
 said one or more computing devices further configured to link a code to said inspection photograph or said inspection multi-media recording, and to said at least one or more of sales information, shipping information, pack out information, and inventory information; and
 a web-based application configured to allow said customer to access said tracing information within said central database after said customer receives said commodity by entering the code into said web-based application, said web-based application comprising a web page to display a hyper-text markup language (HTML) link to access said inspection information, said inspection information comprising an inspection report that indicates a safety rating of said commodity.

2. The system of claim 1, wherein said code comprises a facility identification code assigned to an account created through said web-based application, such that when said facility identification code is entered into said web-based application, data associated with said account is retrieved.

3. The system of claim 1, wherein said code incorporates a 128-bit barcode.

4. The system of claim 3, wherein said 128-bit barcode also comprises a company number assigned to a shipper by a brand owner, when said shipper packs and ships in a label of said brand owner different than a label of said shipper.

5. The system of claim 1, wherein a lot code associated with a product is assigned to at least one lot record within said database, depending on a source location of contents of said product.

6. The system of claim 5, wherein said lot code is assigned to a plurality of lot records within said database when said contents of said product originate from different source locations.

7. The system of claim 5, wherein a plurality of lot records within said database are assigned to a new lot record when said contents of said product originate from different source locations, such that said lot code is assigned to said new lot record.

8. The system of claim 1, wherein when a first company packs a product with a label of a second company, said second company assigns a company number to said first company within internal systems of said second company.

9. The system of claim 1, further comprising a plurality of videos associated to an individual lot, such that all of said videos are accessible upon entering a lot code of said individual lot into said web-based application.

10. The system of claim 1, further comprising a printer configured to print a lot code associated with said commodity lot is on stickers and attaching said stickers to each individual item of said commodity lot.

11. The system of claim 1, wherein said stickers are attached to said individual items of said commodity lot as said individual items pass through a packing line sizer comprising labeling machines.

12. A system for allowing a customer to access tracing information related to an order of a commodity selected from a source lot, said system comprising:
   a server configured to store said tracing information in a central database, said tracing information including information corresponding to the source lot of said order of said commodity including a representative photograph or an inspection multi-media recording of said source lot of said commodity and at least one or more of sales information, shipping information, pack out information, and inventory information corresponding to said order of said commodity;
   one or more computing devices having one or more applications configured to enter said tracing information into said central database;
   said one or more computing devices further configured to link a code to said representative photograph or said inspection multi-media recording, and to said at least one or more of sales information, shipping information, pack out information, and inventory information; and
   a web-based application configured to allow said customer to access said tracing information within said central database after said customer receives said commodity by entering the code into said web-based application, said web-based application comprising a web page to display a hyper-text markup language (HTML) link to access said source lot information.

* * * * *